United States Patent [19]

Takayama

[11] Patent Number: 4,974,058
[45] Date of Patent: Nov. 27, 1990

[54] COLOR SIGNAL PROCESSING APPARATUS USING A PLURALITY OF SAMPLE-AND-HOLD CIRCUITS AND A SINGLE SWITCHED A/D CONVERTER

[75] Inventor: Makoto Takayama, Kawasaki, Japan

[73] Assignee: Canon Kabushiki Kaisha, Tokyo, Japan

[21] Appl. No.: 488,539

[22] Filed: Feb. 28, 1990

Related U.S. Application Data

[63] Continuation of Ser. No. 177,837, Mar. 24, 1988, abandoned, which is a continuation of Ser. No. 751,199, Jul. 2, 1985, abandoned.

[30] Foreign Application Priority Data

Jul. 16, 1984 [JP] Japan .................................. 59-147096

[51] Int. Cl.$^5$ .............................................. H04N 1/46
[52] U.S. Cl. ...................................... 358/75; 358/13; 358/21 R; 370/112
[58] Field of Search ................... 358/12, 13, 15, 75, 358/21 R; 370/112

[56] References Cited

U.S. PATENT DOCUMENTS

| | | | |
|---|---|---|---|
| 3,059,228 | 10/1962 | Beck et al. ........................... | 370/112 |
| 3,087,011 | 4/1963 | Boothroyd et al. .................. | 358/15 |
| 3,636,244 | 1/1972 | Smierciak et al. ................... | 358/15 |
| 3,996,607 | 12/1976 | Heitmann .............................. | 358/13 |
| 4,058,835 | 11/1977 | Kennedy ................................ | 358/138 |
| 4,163,248 | 7/1979 | Heitmann .............................. | 358/13 |
| 4,176,373 | 11/1979 | Dillon ..................................... | 358/12 |
| 4,346,401 | 8/1982 | Ohara ..................................... | 358/75 |
| 4,409,610 | 10/1983 | Jaeger .................................... | 358/12 |
| 4,549,201 | 10/1985 | Tanaka et al. ......................... | 358/13 |
| 4,563,700 | 1/1986 | Sato ....................................... | 358/138 |
| 4,584,601 | 4/1986 | Suzuki et al. ......................... | 358/75 |
| 4,625,234 | 11/1986 | Yamada ................................. | 358/75 |
| 4,727,436 | 2/1988 | Kawamura et al. ................. | 358/298 |

FOREIGN PATENT DOCUMENTS

| | | | |
|---|---|---|---|
| 137380 | 8/1983 | Japan ..................................... | 358/13 |
| 41970 | 3/1984 | Japan ..................................... | 358/75 |

*Primary Examiner*—John W. Shepperd
*Attorney, Agent, or Firm*—Fitzpatrick, Cella, Harper & Scinto

[57] ABSTRACT

An apparatus for color signal processing wherein plurality kinds of color component signals are input. Sample-and-holding and analog-to-digital conversion indicating signals are generated asynchronously. The color component signals are sampled and held in response to the sample-and-holding indicating signal. The analog output is then converted to digital signal by an analog-to-digital converter in response to the analog-to-digital conversion indicating signal.

11 Claims, 4 Drawing Sheets

4,974,058

COLOR SIGNAL PROCESSING APPARATUS USING A PLURALITY OF SAMPLE-AND-HOLD CIRCUITS AND A SINGLE SWITCHED A/D CONVERTER

This application is a continuation of application Ser. No. 07/177,837, filed Mar. 24, 1988, which was a continuation of application Ser. No. 06/751,199, filed July 2, 1985, now abandoned.

BACKGROUND OF THE INvENTION

1. Field of the Invention

The present invention relates to a color video signal processing apparatus which processes a color video signal and, more particularly, to a color video signal processing apparatus which performs analog-to-digital conversion (to be referred to as A/D conversion hereinafter) for each component signal included in the color video signal.

2. Description of the Prior Art

Conventionally, a television signal is sampled at points a, b, c, . . . on lines 2 along a vertical direction a of an image plane 1, as shown in FIG. 1. Thereafter, the obtained signal is A/D converted.

FIG. 2 shows a conventional processing circuit for A/D conversion. In the drawing, reference numerals 3, 4 and 5, respectively, denote R, G and B signals which are supplied into the circuit. These signals 3, 4 and 5 are A/D converted by A/D converters 6, 7 and 8 to obtain digital data 9, 10 and 11, respectively. A horizontal sync signal 12 is supplied into a sampling pulse generator 13. The generator 13 then generates a sampling pulse 14 to control the A/D converters 6, 7 and 8.

In this case, since a video signal of high frequency is sampled, the aperture for sampling must be set small. Therefore, even if a sampling period and a horizontal scanning period are the same, an A/D converter of high speed is required. Generally, such an A/D converter of high speed is so expensive that, if a system of this type requires three converters, the system is also expensive.

SUMMARY OF THE INVENTION

It is an object of the present invention to overcome the conventional drawback, and to provide a color video signal processing apparatus in which each signal component in a color image signal can be first sampled and held and then A/D converted with a simple structure.

More specifically, it is the object of the present invention to provide a color video signal processing apparatus in which each signal component in a color video single can be A/D converted by a signal A/D converter.

The above and other objects, features and advantages of the present invention will be apparent from the accompanying description and the drawings.

DETAILED DESCRIPTION OF THE PREFERRED EMBODIMENT

Figure 1:
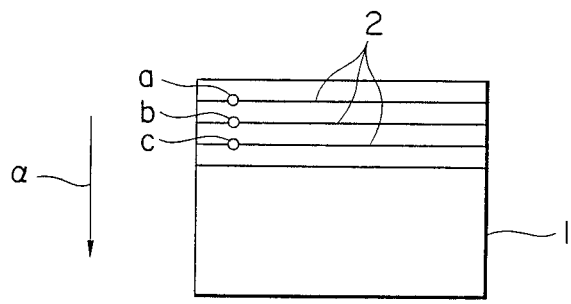
FIG. 1 is a view for explaining sampling of a video signal.
Figure 2:
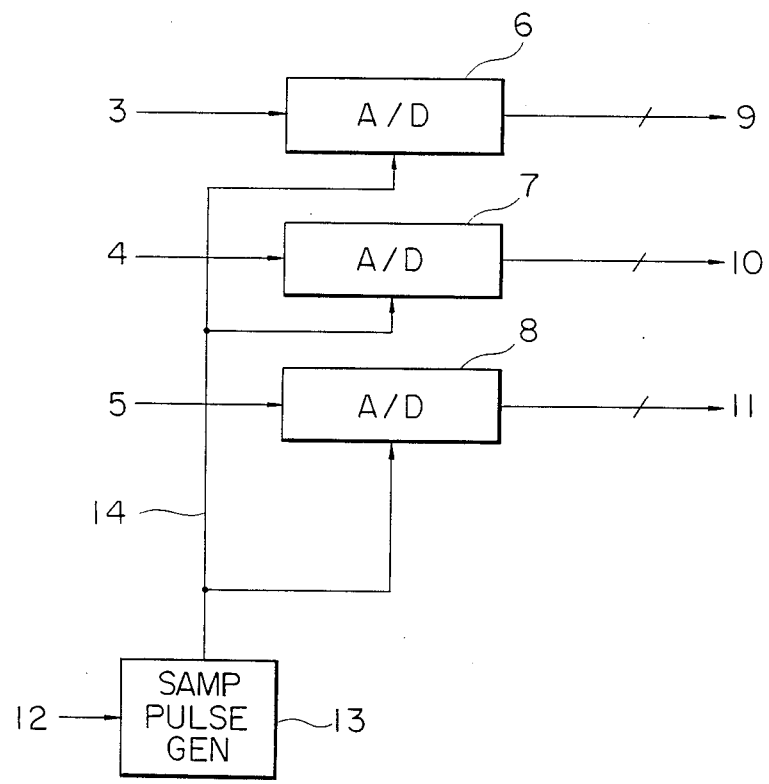
FIG. 2 is a block diagram of a conventional sampling circuit.
Figure 3:
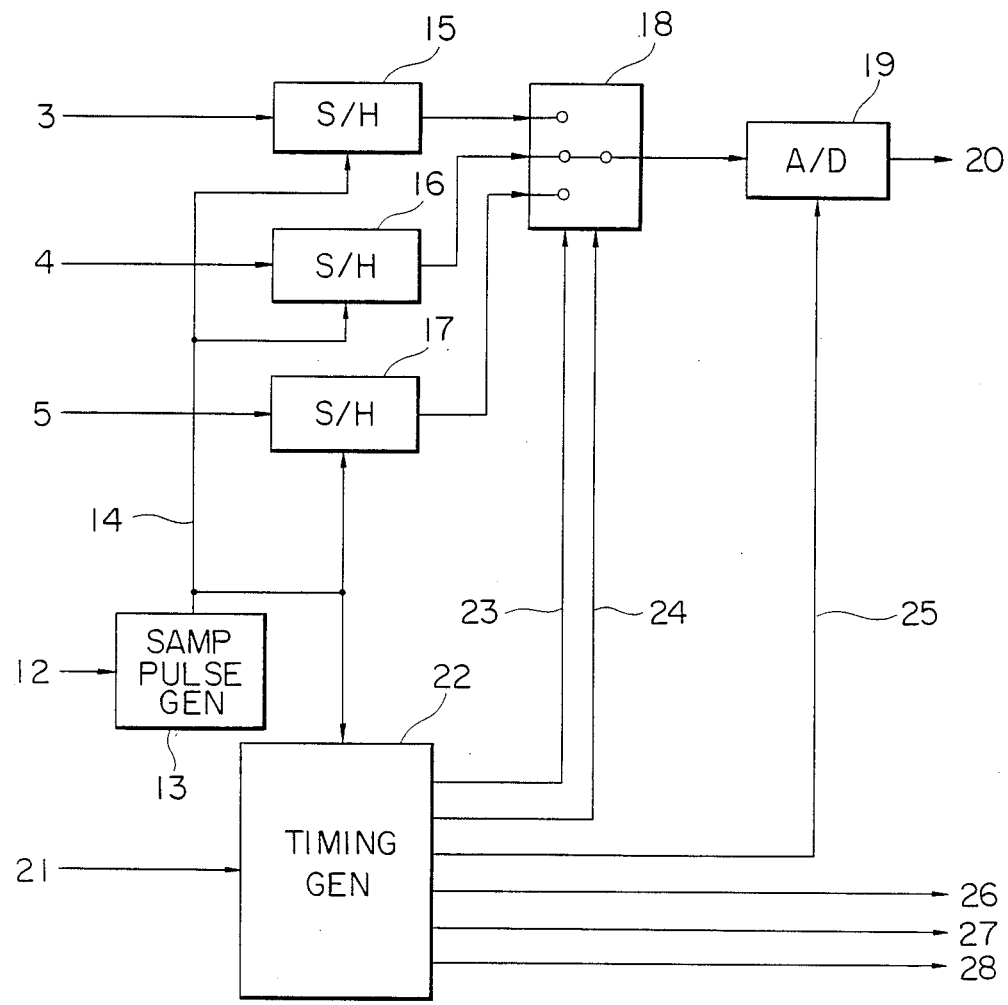
FIG. 3 is a block diagram of a color video signal processing circuit according to the present invention.

FIG. 3 is a block diagram of a color video signal processing circuit according to an embodiment of the present invention. In FIG. 3, reference numeral 13 denotes a sampling pulse generator; 15, 16 and 17 denote sample-and-hold (S/H) circuits for R, G and B signals, respectively; 18 denotes an analog switch circuit for selecting one of the outputs from the S/H circuits 15, 16 and 17; 19 denotes an analog-to-digital (A/D) converter; and 22 denotes a timing generator. A horizontal sync signal 12 included in the input color video signal is supplied into the sampling pulse generator 13. A sampling pulse 14 is generated from the sampling pulse generator 13 and supplied into the S/H circuits 15 to 17 and the timing generator 22, respectively.

Input R, G and B signals 3, 4 and 5 are supplied into the S/H circuits 15, 16 and 17, respectively. The S/H circuits 15, 16 and 17 perform the S/H operation for the R, G and B signals at the timing of the sampling pulse 14, respectively. Then, the output R, G and B signals of the S/H circuits 15 to 17 are supplied into the analog switch circuit 18 which serves as a selection means. The analog switch circuit 18 selects one of the output signals from the S/H circuits 15 to 17 under the control of analog switch control signals 23 and 24 supplied from the timing generator 22. The output from the analog switch circuit 18 is supplied into the A/D converter 19 such that the output is converted into digital data 20 under the control of an A/D conversion clock pulse 25 supplied from the timing generator 22.

The timing generator 22 receives a master (reference) clock pulse 21 and the sampling pulse 14 and supplies the analog switch control signals 23 and 24 for controlling the analog switch circuit 18, the A/D conversion clock pulse 25, data discrimination signals 26 and 27, and a signal 28 which indicates that the data is valid (to be referred to as a data validity signal hereinafter).

Figure 4:
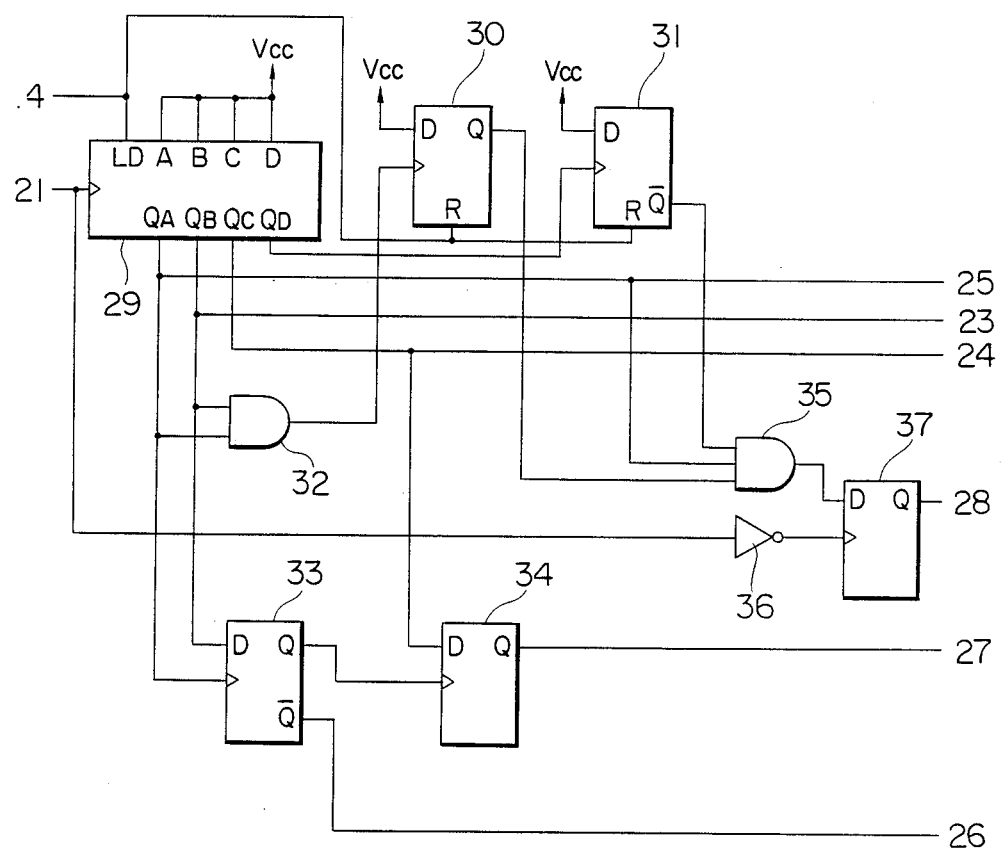
FIG. 4 is a detailed block diagram of a timing generator 22 shown in FIG. 3.
Figure 5:
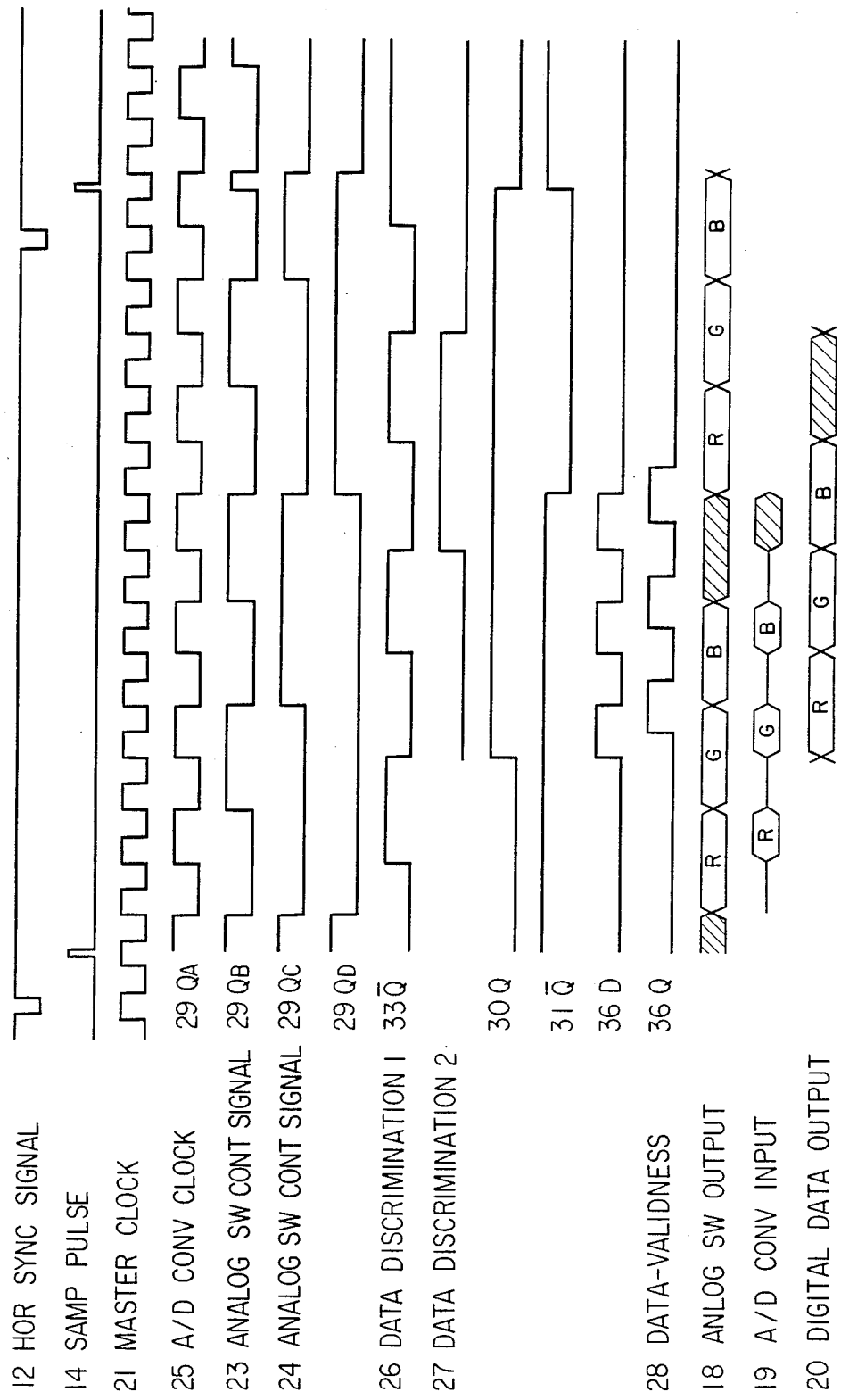
FIG. 5 is a chart showing waveforms of signals shown in FIGS. 3 and 4.

FIG. 4 shows a detailed configuration of the timing generator 22 and FIG. 5 is a timing chart of the signals supplied into and from the generator 22. In the drawings, reference numeral 29 denotes a presettable up-counter. When the sampling pulse 14 is supplied into the counter 29, a numeral "16" is preset and the master clock pulse 21 is counted such that the counter 29 generates the timing signals such as the A/D conversion clock pulse 25, the analog switch control signals 23 and 24, and the like. The analog switch circuit 18 is controlled in accordance with the state of the analog switch control signals 23 and 24, as shown in Table 1 below:

TABLE 1

|  | Signal 23 | Signal 24 |
| --- | --- | --- |
| Selection of R | L | L |
| Selection of G | H | L |
| Selection of B | L | H | where L represents the low-level state and H represents the high-level state.

The presettable up-counter 29, AND gates 32 and 35, D-type flip-flops (DFF) 30, 31 and 37, and an inverter 36 together produce the data-validness signal 28. When the signal 28 is set at H level, the output digital data 20 from the A/D converter 19 is valid.

The presettable up-counter 29, DFFs 33 and 34 together produce the data discrimination signals 26 and 27. The relationship between the state of data discrimination signals 26 and 27, and the state of the respective R, G and B output data is shown in Table 2 below:

TABLE 2

|  | Signal 26 | Signal 27 |
| --- | --- | --- |
| R output | L | L |
| G output | H | L |
| B output | L | H |

According to Table 2, the data reception side can accurately discriminate the R, G and B digital data included in the output digital data 20 by the data-validity signal 28 and the data discrimination signals 26 and 27.

As described above, the R, G and B analog signals are respectively S/H processed at the same timing. Then, the S/H processed signals are selected in order so as to serialize the three components and supplied into the signals single A/D converter to convert them into digital data. In this case, the sampling of the S/H circuit must be performed with a small aperture so as to reduce a voltage drop. However, the A/D converter may perform three A/D conversions during a single horizontal scanning period. That is, when the R, G and B analog television signals are sampled in the vertical direction of the image plane of the television set to convert these analog signals into digital data, the A/D converter may perform only three A/D conversions by the time of the next sampling, i.e., during a single horizontal scanning period (about 60 μsec in the case of the NTSC color system). Therefore, a high-speed A/D converter which is usually expensive is not needed for the present apparatus, thereby realizing a low-cost A/D conversion. Further, each color-component signal is sampled at the same timing so that color aberration or the like does not occur.

In the present invention, it is assumed that a color video signal is divided into three kinds of color component signals (red, green and blue signals). However, the present invention can be applied to other division methods in which, e.g., a color video signal is divided into luminance, I and Q signals.

As described above, according to the present invention, every component signal in the color video signal can be A/D converted by a single A/D converter. Therefore, the number of expensive A/D converters can be reduced in such a color video signal processing apparatus, resulting in low cost.

The present invention is not limited to the above discussed precise embodiment, and various changes and modifications may be effected within the spirit and scope of the following claims.

What I claim is:

1. A color signal processing apparatus, comprising:
input means for inputting, in parallel, a plurality of color component signals of an input color video signal;
generation means for generating a sampling pulse every horizontal scanning period so as to perform sampling of a color video signal every horizontal scanning period, wherein the sampling pulse is in synchronism with a horizontal synchronizing signal, and the sampling is performed for one line in a direction perpendicular to a horizontal scanning direction within a color video signal generation period for one image plane; wherein said generation means includes:

means for receiving the horizontal synchronizing signal and producing the sampling pulse, and
means for receiving a clock and the sampling pulse and outputting an analog-to-digital conversion indicating signal;
a plurality of sample-and-hold circuits for sampling and holding, at the same sampling time, each color component signal of the color video signal in response to the sampling pulse, each of said plurality of sample-and-hold circuits being respectively associated with each one of the plurality of color component signals;
a selection circuit for sequentially selecting outputs of said plurality of sample-and-hold circuits at a selection timing within a period up to the generation of the next sampling pulse; and
a single analog-to-digital converter for sequentially analog-to-digital converting the outputs of said selection circuit in synchronism with the selection made by said selection circuit, responsive to the analog-to-digital conversion indicating signal.

2. An apparatus according to claim 1, wherein the components of the color video signal include R, G and B color components.

3. A color image signal processing apparatus, comprising:
(a) supply means for supplying a plurality of kinds of color component signals;
(b) generating means for generating a sample-and-holding indicating signal and an analog-to-digital conversion indicating signal, wherein said generating means includes:
means for receiving horizontal sync signals and producing the sample-and-holding indicating signal, and
means for receiving a clock and the sample-and-holding indicating signal and outputting the analog-to-digital conversion indicating signal;
(c) sample-and-hold means for sampling and holding the plurality of kinds of color component signals supplied by said supply means, in response to the sample-and-holding indicating signal;
(d) selection means for selecting one of the plurality of kinds of color component signals sampled and held by said sample-and-hold means, in response to a selection indication signal; and
(e) analog-to-digital conversion means for analog-to-digital converting the one of the plurality of kinds of color component signals selected by said selection means, in response to the analog-to-digital conversion indicating signal.

4. An apparatus according to claim 3, further comprising selection means sequentially switching the plurality of kinds of color component signals at a predetermined timing.

5. An apparatus according to claim 3, wherein the sample-and-holding indicating signal and the analog-to-digital conversion indicating signal are each a one-bit signal.

6. An apparatus according to claim 3, wherein said sample-and-hold means comprises at least a number of sample-and-hold circuits which equal in number the color component signals, and said sample-and-hold circuits each respectively perform sample-and-hold operation for the respective corresponding color component signal.

7. A signal processing apparatus comprising:

(a) parallel input means for inputting a plurality of kinds of signals in parallel;
(b) generating means for generating a sample-and-hold indicating signal and an analog-to-digital conversion indicating signal, wherein said generating means includes:
   means for receiving horizontal sync signals and producing the sample-and-holding indicating signal, and
   means for receiving a clock and the sample-and-holding indicating signal and outputting the analog-to-digital conversion indicating signal;
(c) sample-and-hold means for sampling and holding the plurality of kinds of signals input by said parallel input means, in response to the sample-and-hold indicating signal;
(d) selection means for selecting one of the plurality of kinds of color component signals sampled and held by said sample-and-hold means, in response to a selection indication signal; and
(e) analog-to-digital conversion means for analog-to-digital converting the one of the plurality of kinds of signal selected by said selection means, in response to the analog-to-digital indicating signal.

8. An apparatus according to claim 7, wherein the plurality kinds of signals include a plurality of color component signals.

9. An apparatus according to claim 8, further comprising selection means sequentially switching the plurality kinds of color component signals at a predetermined timing.

10. An apparatus according to claim 8, wherein said sample-and-hold means comprises at least a number of sample-and-hold circuits which equal in number the color component signals, and said sample-and-hold circuits each respectively perform sample-and-hold operation for the respective corresponding color component signal.

11. An apparatus according to claim 7, wherein the sample-and-hold indicating signal and the analog-to-digital conversion indicating signal are each a one-bit signal.

* * * * *

UNITED STATES PATENT AND TRADEMARK OFFICE
CERTIFICATE OF CORRECTION

PATENT NO. : 4,974,058                           Page 1 of 2

DATED : November 27, 1990

INVENTOR(S) : MAKOTO TAKAYAMA

It is certified that error appears in the above-identified patent and that said Letters Patent is hereby corrected as shown below:

Title Page:
AT [57] ABSTRACT

Line 2, "rality" should read --ral--.

COLUMN 1

Line 11, "INvENTION" should read --INVENTION--.
    Line 23, "vertical direction a" should read --vertical direction α--.
    Line 53, "single" should read --signal-- and "signal A/D" should read --single A/D--.

COLUMN 2

Line 39, "data validity signal" should read --data-validity signal"--.
    Line 63, "data-validness signal 28" should read --data-validity signal 28--.

COLUMN 3

Line 19, "signals" should be deleted.
    Line 22, "a" should be deleted.
    Line 49, "above" should read --above- --.

UNITED STATES PATENT AND TRADEMARK OFFICE
CERTIFICATE OF CORRECTION

PATENT NO. : 4,974,058

DATED : November 27, 1990

INVENTOR(S) : MAKOTO TAKAYAMA

It is certified that error appears in the above-identified patent and that said Letters Patent is hereby corrected as shown below:

COLUMN 6

Line 1, "signal" should read --signals--.
    Line 4, "plurality kinds" should read --plurality of kinds--.
    Lines 6-9 should be deleted.

Signed and Sealed this

Eighth Day of December, 1992

Attest:

DOUGLAS B. COMER

*Attesting Officer*    *Acting Commissioner of Patents and Trademarks*